(12) United States Patent
Sekiya

(10) Patent No.: US 9,195,619 B2
(45) Date of Patent: Nov. 24, 2015

(54) SEMICONDUCTOR MEMORY DEVICE

(75) Inventor: Masahiro Sekiya, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 237 days.

(21) Appl. No.: 13/589,467

(22) Filed: Aug. 20, 2012

(65) Prior Publication Data
US 2013/0179628 A1 Jul. 11, 2013

(30) Foreign Application Priority Data

Jan. 6, 2012 (JP) ................................. 2012-001118

(51) Int. Cl.
*G06F 12/00* (2006.01)
*G06F 13/16* (2006.01)
(52) U.S. Cl.
CPC ...................................... *G06F 13/16* (2013.01)
(58) Field of Classification Search
CPC . G06F 13/16; G06F 13/1668; G06F 13/1673; G06F 13/1684
USPC ........................................................ 711/103
See application file for complete search history.

(56) References Cited

U.S. PATENT DOCUMENTS

| | | | | |
|---|---|---|---|---|
| 5,594,916 A | * | 1/1997 | Watanabe et al. | 711/150 |
| 5,872,777 A | * | 2/1999 | Brailean et al. | 370/349 |
| 7,512,759 B2 | * | 3/2009 | Nakanishi et al. | 711/163 |
| 2001/0027506 A1 | * | 10/2001 | Manning | 711/105 |
| 2009/0119464 A1 | * | 5/2009 | Grundy et al. | 711/154 |
| 2010/0141387 A1 | * | 6/2010 | Kosaka | 340/10.1 |
| 2010/0226349 A1 | * | 9/2010 | Matsuo et al. | 370/338 |
| 2011/0246188 A1 | * | 10/2011 | Nakanishi | 704/207 |
| 2012/0057547 A1 | * | 3/2012 | Lohr et al. | 370/329 |
| 2012/0072654 A1 | * | 3/2012 | Olbrich et al. | 711/103 |
| 2013/0073821 A1 | * | 3/2013 | Flynn et al. | 711/162 |

FOREIGN PATENT DOCUMENTS

| | | |
|---|---|---|
| JP | 9-16732 | 1/1997 |
| JP | 2004-295352 | 10/2004 |
| JP | 2010-134672 | 6/2010 |
| JP | 2010-206469 | 9/2010 |
| JP | 2011-123609 | 6/2011 |

* cited by examiner

*Primary Examiner* — Aimee Li
*Assistant Examiner* — Alex Olson
(74) *Attorney, Agent, or Firm* — Olon, McClelland, Maier & Neustadt, L.L.P.

(57) ABSTRACT

According to one embodiment, a semiconductor memory device includes a memory and a controller. The controller controls the memory, communicates with a host device via a first signal line and a second signal line, and receives data items to be written in the memory from the host device on the first and second signal lines in a first period. The same group number is assigned to two data items which flow in parallel on the first and second signal lines. The controller transmits to the host device a response packet including an indication of a group number assigned to an unsuccessfully received one of the data items.

16 Claims, 9 Drawing Sheets

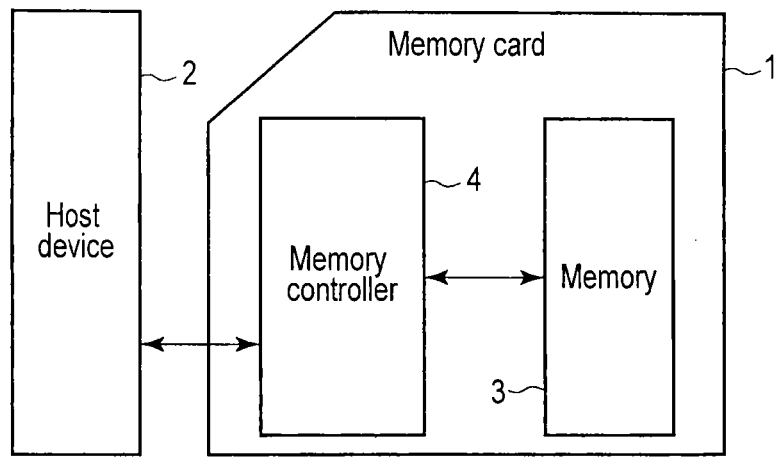
F I G. 1
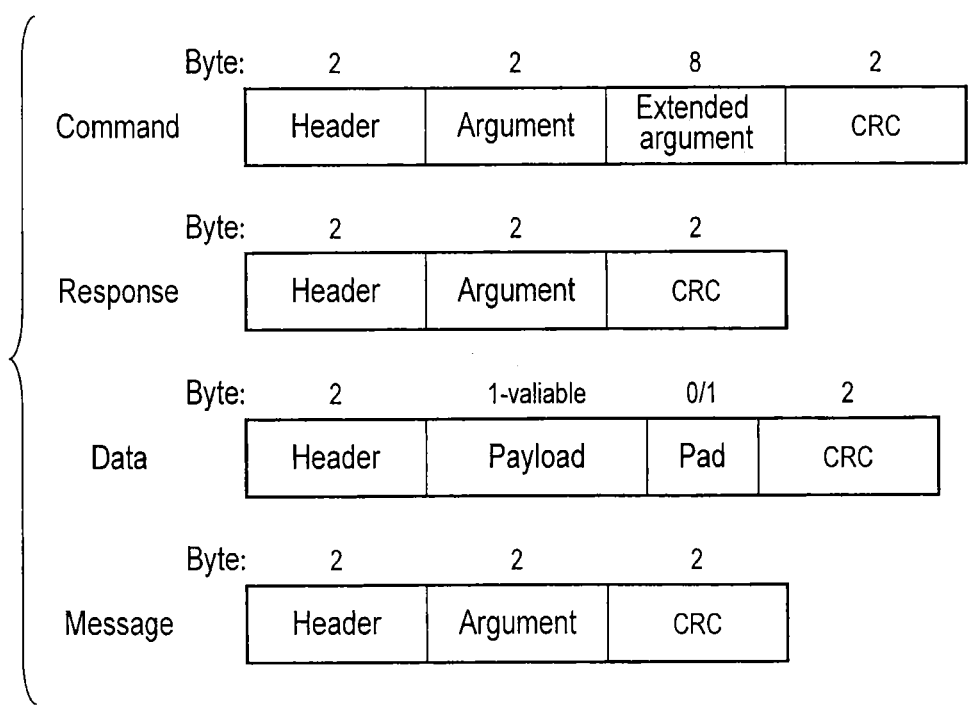
F I G. 2

| Bit<br>Byte | 7 | 6 | 5 | 4 | 3 | 2 | 1 | 0 |
|---|---|---|---|---|---|---|---|---|
| 0 | Header[15:0] | | | | | | | |
| 1 | | | | | | | | |
| 2 | Argument[7:0] | | | | | | | |
| 3 | Argument[15:8] | | | | | | | |
| 4 | Bitmap[7:0]<br>(=8'b0000_1010) | | | | | | | |
| 5 | Bitmap[15:8]<br>(=8'b0000_0000) | | | | | | | |

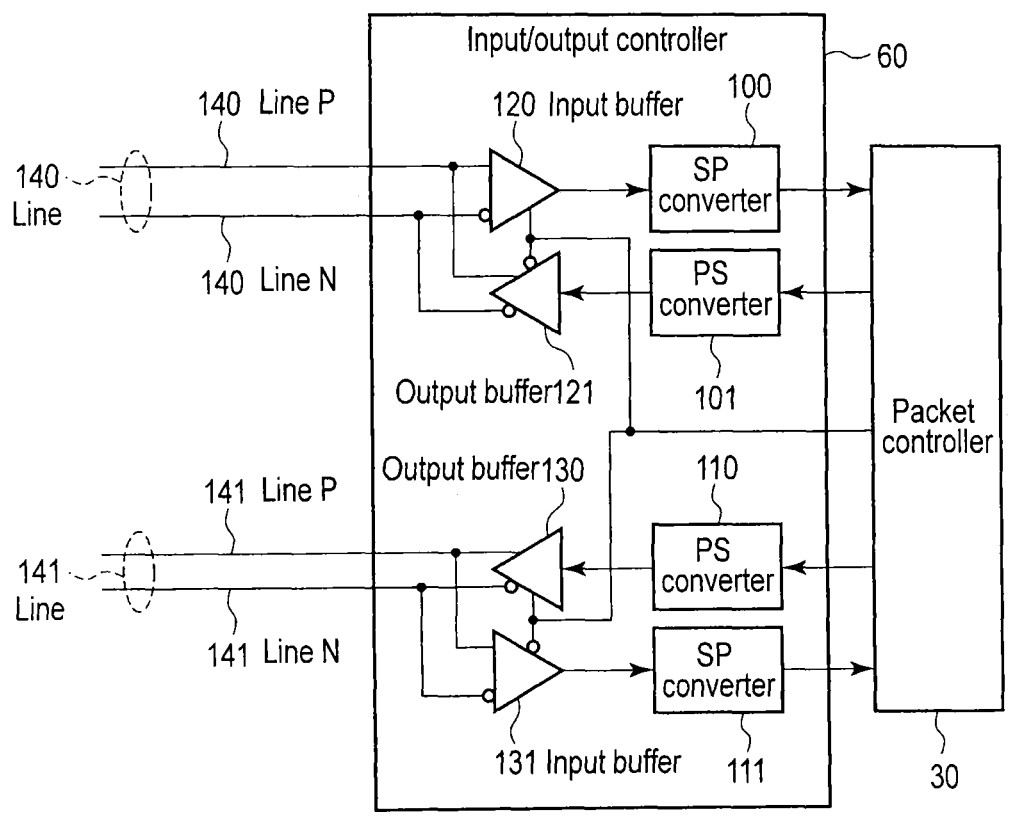
F I G. 5

| Bit<br>Byte | 7 | 6 | 5 | 4 | 3 | 2 | 1 | 0 |
|---|---|---|---|---|---|---|---|---|
| 0 | Header[15:0] | | | | | | | |
| 1 | | | | | | | | |
| 2 | Argument[7:0] | | | | | | | |
| 3 | Argument[15:8] | | | | | | | |
| 4 | SeqNum1[7:0]<br>(=8'b0000_0001) | | | | | | | |
| 5 | SeqNum2[7:0]<br>(=8'b0000_0011) | | | | | | | |

F I G. 7

SEMICONDUCTOR MEMORY DEVICE

CROSS-REFERENCE TO RELATED APPLICATIONS

This application is based upon and claims the benefit of priority from Japanese Patent Application No. 2012-001118, filed Jan. 6, 2012, the entire contents of which are incorporated herein by reference.

FIELD

Embodiments described herein relate generally to a semiconductor memory device.

BACKGROUND

Semiconductor memory devices using nonvolatile memory such as NAND flash memory have become widespread as media for storing data such as music data and video data. For example, SD cards are commonly used as external storage for electronic devices such as digital cameras and cellular phones.

There is now a demand that, as the capacity of nonvolatile memory increases, semiconductor memory device interfaces be capable of higher transfer rates when a host device writes and reads data. Some SD cards can transfer data at up to 104 MB/s, and development of techniques for further acceleration is well advanced in next-generation interfaces.

For systems with such advanced interfaces, various studies have been conducted to increase speed. For example, burst transmission of data packets at short intervals has been proposed in order to improve transfer efficiency. Such data bursting involves processing associated with responding to the reception of data packets, which can constitute an overhead. Specifically, it takes time to switch the input and output buffers in responding, and data packets cannot be transmitted separately when a data error occurs.

To reduce the time for switching buffers, an increased number of data packets may be transmitted during a data burst transmission period. This, however, requires an increased buffer size to temporarily store packets and an increased volume of data to be retransmitted, which is undesirable.

BRIEF DESCRIPTION OF THE DRAWINGS

FIG. 1 illustrates a configuration example of a memory card according to a first embodiment.

FIG. 2 illustrates packet format examples according to the first embodiment.

FIG. 5 illustrates a configuration example of an input and output controller according to the first embodiment.

FIG. 7 illustrates still another example of a packet format according to the first embodiment.

DETAILED DESCRIPTION

Figures 3, 4:
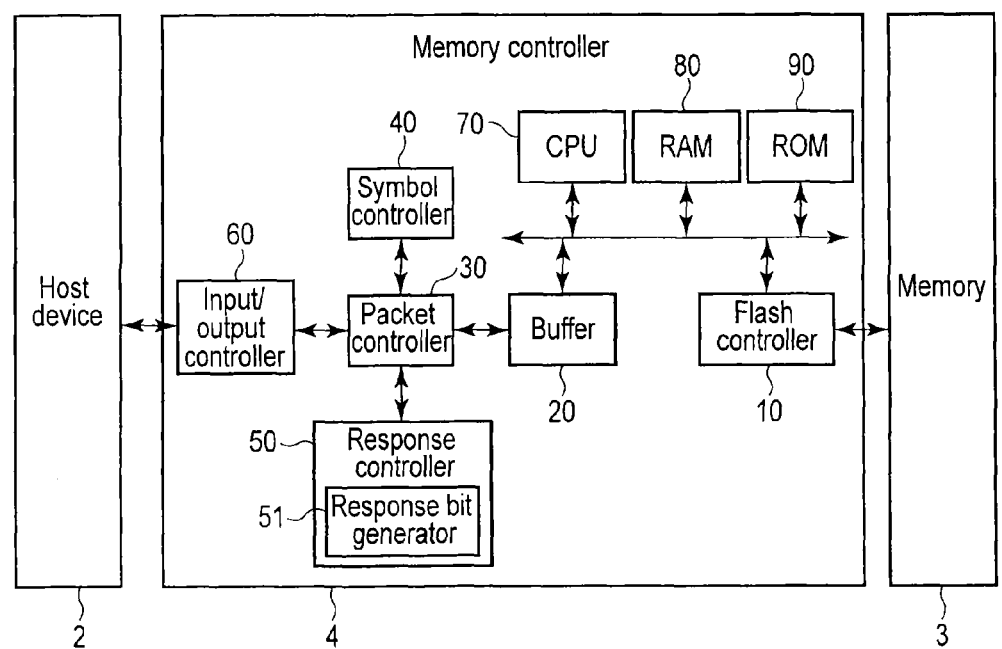
FIG. 3 illustrates another example of a packet format according to the first embodiment.
FIG. 4 illustrates a configuration example of a memory controller according to the first embodiment.

In general, according to one embodiment, a semiconductor memory device includes a memory and a controller which controls the memory. The controller communicates with a host device via a first signal line and a second signal line, receives data items to be written in the memory from the host device on the first and second signal lines in a first period, where the same group number is assigned to two data items which flow in parallel on the first and second signal lines, and transmits to the host device a response packet including an indication of a group number assigned to an unsuccessfully received one of the data items.

In the following description, functional blocks can be realized as hardware, computer software or the combination of the both. In order to clearly illustrate such interchangeability of hardware and software, descriptions will be generally given in terms of their functionality. Whether such functionality is implemented as hardware or software depends on a particular application and design constraints imposed on the overall system. Those skilled in the art may implement the functional blocks in varying ways suitable for each particular application, but any implementation approach is included in the scope of the embodiments.

Furthermore, it is not necessary that the functional blocks are distinguished from one another as described below in specific examples. For example, some of the functions may be performed by functional blocks different from those illustrated below. Moreover, any of the functional blocks may be divided into functional sub-blocks. The embodiment is not limited by the specification of the particular functional blocks.

The following embodiment describes a memory device (semiconductor memory device) which has a memory and a controller which controls the memory. The memory device may be an external storage of a host device and inserted in a slot of the host device. Alternatively, it may be implemented within the host device. The following description describes embodiments using a memory card as an example of the memory device. The memory card may be an SD card.

First Embodiment

Configuration Example of Memory Card

As shown in FIG. 1, a memory card (memory device) 1 is configured to be communicatively coupled to a host device 2 via a bus interface, and to be inserted into a slot (not shown) in the host device 2. The host device 2 may be a personal computer, a digital camera, a music player. The host device 2 has hardware and software for accessing the memory card 1 communicatively coupled to it. When the memory card 1 is coupled to the host device 2, it receives a power from the host device 2, and performs various processes in accordance with control by the host device 2.

The memory card 1 includes a memory 3 and a memory controller 4 for controlling the memory as a configuration associated with hardware. The memory 3 is a nonvolatile memory, and may be a NAND flash memory. The memory card 1 receives and transmits information from and to the host device 2 via a bus interface. The memory card 1 also includes signal pins (not shown). The signal pins are electrically coupled to the memory controller 4. The signal pins may include a supply voltage (for example, 3.3 or 1.8 V) pin, a ground (GND) pin, a clock signal pin, data signal pins, and a command signal pin. The data signal pins may include bus signal pins of four-bit data, or small-amplitude differential-signal pins. The bus interface is configured by pins for receiving and transmitting data. The memory controller 4 communicates various signals and data with a host controller in the host device 2 via these signal pins. Specifically, when data is written in the memory card 1, the host controller may transmit a write command to the memory controller 4 as serial electrical information via the data signal pins. The memory controller 4 takes in the write command received from the data signal pins in accordance with the clock signal supplied to the clock signal pin.

Communication between the memory 3 and memory controller 4 is performed via the interface for the memory 3. The interface is coupled by eight-bit input/output signal lines. The memory controller 4 may communicate a command, an address and data for reading, writing or erasing data from, to or in the memory 3, respectively. For a case of the memory 3 being the NAND flash memory, the interface is a NAND interface.

(Configuration Example of Packet)

FIG. 2 illustrates examples of a format of packets communicated between the memory card 1, or memory controller 4, and host device 2 according to the first embodiment. FIG. 2 illustrates packets of four types, i.e., a command packet, a response packet, a data packet, and a message packet.

Each packet includes a header common to four packet types. The header includes information required for the host controller or memory controller 4 for a reception processing. Specifically, the header may include a type field, an identification (ID) field and a TID field. The type field includes a value according to the packet type. A bit string in the type field specifies the packet as one of the command packet, response packet, data packet and message packet. The ID field includes a direct address or individual identification information of a transmitter. The TID field includes an identification number for identifying a generated process such as data reading or data writing.

Each packet further includes a specific one of an argument section, an extended argument section, a payload section, a pad section, and a cyclic redundancy code (CRC) section. The argument section may be included in the command, response and message packets. The extended argument section may be included in the command packet. The payload and pad sections may be included in the data packet. The CRC section may be included in the command, response, data and message packets. The argument section includes control information such as an address of an area of the memory 3 which stores specific data. The payload section includes data to be read or data to be written in the memory 3. The pad section includes a bit for adjusting the length of a packet to even bytes. The CRC section includes the CRC used to determine whether the argument, extended argument, payload and pad sections were correctly received. The fields other than the header may include different information for the different packets of four types even they have the same names.

In the command packet, the argument section may include an RW bit, a duplex mode bit and a unit bit. The RW bit indicates whether the command is a data read transfer command or a data write transfer command. The duplex mode bit specifies a transfer mode of a data packet during data transfer. The unit bit specifies the unit for the value in a transfer length field described later. The extended argument section in the command packet may include the transfer length field and a data address field. The transfer length field includes a value which indicates the total amount of data to be transferred.

The data address field indicates an address in the memory 3 for the data to be read or written. The memory controller 4 which received the command packet recognizes that it is the command packet from the type field and it is the packet addressed to the memory controller 4 from the ID field, and also recognizes the ID of the transmitter of the command packet. It also identifies the command packet is for the read process or write process from the RW bit, and recognizes the address of an area in the memory to be accessed from the data address field. When the memory controller 4 receives a command packet addressed to it, it transmits back a response packet to the transmitter.

In the response packet, the argument section includes a negative acknowledge (Negative Ack) bit.

The negative acknowledge bit indicates whether the memory controller 4 can correctly process the instruction indicated by the received command packet. For example, when the command packet specifies an address which does not exist in the memory area, the memory controller 4 determines that it cannot correctly process the command, and sets "1" in the negative acknowledge bit. In contrast, when the memory controller 4 determines that it can correctly process the command, it sets "0" in the negative acknowledge bit.

In the data packet, the payload section may include data which will be written in the memory 3 by the host device 2. The length of the payload section is made the same as determined by a prior-data-communication negotiation between the host device 2 and memory card 1 such as 512 bytes. The determined size of the data is herein referred to as a unit data. For example, large write data is divided into this specific size, and is handled in units of the unit data. The pad section adds a bit to odd-bytes length data packet to adjust it to even-bytes length one. The pad section is not added to even-bytes length data packet. The memory card 1 according to the present embodiment operates in a half duplex mode. The half duplex mode refers to a system which generally uses two separate data lines for communication of opposite directions respectively, and reverses one of the directions to use both the data lines during data packet transfer. In the half duplex mode, unit data is divided into two segments, which are transmitted in parallel by two separate data packets. Specifically, a unit data may be transmitted in parallel by each payload section of the data 0 and data 1 packets. As for how to divide it, the payload section of the data 0 packet may include the data from every even-numbered byte in unit data, and that of the data 1 packet may include the data from every odd-numbered byte in this unit data.

The data packet is also assigned a group number. In the half duplex mode, unit data is transmitted in parallel by two data packets, and these two data packets have different payload sections but have the same header section. Then, a data packet transmitter such as the host device 2 assigns group number 0 to two data packets derived from the same unit data such as the data 0 and data 1 packets during the data writing. Similarly, group numbers 1, 2 and 3 are also assigned to the subsequent second, third and fourth unit data, respectively. When there is further unit data, a group number is assigned to it according to the same principle as the above description. The group number may be included in the header section of the data packet, or in an additional field different from the header section. A data packet receiver, which may be the memory card 1 during data writing, is configured to recognize the group number assigned to the received data packet.

In the message packet, the argument section may include an index field and an error field. The index field indicates a sub-type of a packet implemented by the message packet. Specifically, the message packet may serve as a request packet, a ready packet or a status packet. The index field includes bits which indicate one of such types assumed by the message packet. The request and ready packets are used for the negotiation before the burst data transmission. The status packet is used to notify the state of reception of data packet after burst data transmission is finished. The error field indicates a type of error when an error occurs, and may indicate, when a reception buffer in the receiver overflows, such a state.

As a further sub-type implemented by the message packet, status 2 packet is defined. The status packet includes the error bit which specifies whether all the data packets were successfully received by the data receiver. This bit is effective when at least one data packet is erroneous during a burst data transmission period. When this bit indicates occurrence of an error, the data transmitter retransmits all the same data packets as previous ones. Therefore, it is impossible to retransmit only the erroneous data packet individually. Then, the status 2 packet is defined in order to enable a request to retransmit an individual data packet which was unsuccessfully received by the data receiver. The status 2 packet may have a configuration shown in FIG. 3. The status 2 packet includes the same configuration as the status packet, and also a new bitmap field (Bitmap) as shown in FIG. 3. In order for a receiver to recognize the status 2 packet, a new unique bit string (for example, 2'b0100) is provided in the index field of the argument section of the message packet. The bitmap field has 16 bits in size, and Bitmap[0] corresponds to group number 0. Therefore, in this example, the reception status for group numbers 0 to 15 can be reported to the data transmitter.

(Configuration Example of the Memory Controller 4)

Following instructions from the host device 2, the memory controller 4 executes an operation for reading data from the memory 3 and transferring the read data to the host device 2, or for writing in the memory 3 data received from the host device 2. The following describes in particular a configuration for the host device 2 and memory controller 4 to communicate with each other.

FIG. 4 illustrates an example configuration of the memory controller 4 according to the first embodiment. The memory controller 4 may include functional blocks such as a flash controller 10, a buffer 20, a packet controller 30, a symbol controller 40, a response controller 50, and an input/output controller 60. The flash controller 10, buffer 20, and input/output controller 60 may be typically implemented as hardware. In contrast, the packet controller 30, symbol controller 40, and response controller 50 may be implemented as hardware, software, or the combination of the both. For entire or partial implementation by software or other purposes, the memory controller 4 includes at least a central processing unit (CPU) 70, a random access memory (RAM) 80, and a read-only memory (ROM) 90 as hardware. The ROM 90 stores a program for implementing the operation of the packet controller 30, symbol controller 40, and response controller 50. Upon start of an operation by the memory controller 4, this program is loaded to the RAM 80 and executed by the CPU 70 to perform the operation of the packet controller 30, symbol controller 40, and response controller 50. The RAM 80 is used as a work memory for the CPU 70, and stores a control program, and may be a static RAM (SRAM). The ROM 90 also stores firmware, or a control program, for the CPU 70 to manage the whole memory controller 4. When a power is supplied to the memory card 1 from the host device 2, the firmware is loaded from the ROM 90 to the RAM 80 and CPU 70 performs predetermined processes in accordance with the firmware. Thus, the CPU 70 controls operation of the memory controller 4.

The flash controller 10 controls access to the memory 3 by the memory controller 4 in accordance with the control by the CPU 70. During the data reading, it receives the data read from the memory 3, and stores it in the buffer 20. During the data writing, it reads data received from the host device 20 and then stored in the buffer 20 from the buffer 20, and writes it in the memory 3 in accordance with the control by the CPU 70.

The buffer 20 temporarily stores the data read from the memory 3 and transfers it to the packet controller 30. The buffer 20 also temporarily stores the write data received from the host device 2 and transfers it to the flash controller 10.

The symbol controller 40 generates and transfers to the packet controller 30 various symbols (or a control signal) required for the memory card 1 to communicate with the host device 2 in accordance with the control by the CPU 70 and the packet controller 30. The symbol controller 40 also receives a signal received by the input/output controller 60 via the packet controller 30 and analyzes it to determine whether it is a specific symbol. It reports the analysis result to the packet controller 30 to instruct a start and end of packet reception, and reports switching of the direction of input and output of the buffer in the input/output controller 60. Specifically, the symbol controller 40 generates a symbol which indicates an idle state while no packets are communicated, and generates a symbol which indicates a start and end of a packet when the packet controller 30 transmits the packet. When the symbol controller 40 detects the symbol which indicates the start of the packet during packet reception, it instructs the packet controller 30 to start packet reception. The symbol controller 40 is configured to recognize and generate all the symbols described herein, and to execute corresponding operations.

The packet controller 30 executes a process for receiving the command packet, a process for transmitting the response packet, and processes for receiving and transmitting the data and message packets in accordance with the control by the CPU 70. The packet controller 30 is configured to recognize and generate all the packets described herein including these packets and to execute corresponding operations. The packet controller 30 also generates the data packet from the read data stored in the buffer 20 in accordance with the format, and transmits it to the input/output controller 60. The packet controller 30 extracts the payload section of a data packet transferred from the host device 2 via the input/output controller 60, and stores it in the buffer 20. The packet controller 30 transmits the symbol from the symbol controller 40 to the input/output controller 60. The packet controller 30 controls the direction of the input and output buffers in the input/output controller 60 in accordance with information from the symbol controller 40. The packet controller 30 includes a CRC processor 31. The CRC processor 31 executes a CRC check on a received data packet, and passes the result to a module which controls the whole packet controller 30.

The response controller 50 stores in a response bit generator 51 the reception condition of the data packet received from the host device 2 in accordance with the control by the CPU 70 and packet controller 30. The response controller 50 reports information on the reception condition of the data packet to the packet controller 30, when the packet controller 30 transmits back the status packet to the host device 2.

The input/output controller 60 converts a parallel signal (for example, an eight-bit signal) from the packet controller 30 into a serial signal (one-bit signal), and transmits the converted signal to the host device 2. The input/output controller 60 also converts a serial signal from the host device 2 into a parallel signal, and transmits the converted signal to the packet controller 30. When the packet controller 30 instructs the direction of the input and output buffers, the input/output controller 60 switches the direction in accordance with the instruction.

(Configuration Example of Input/Output Controller 60)

FIG. 5 illustrates a configuration example of the input/output controller 60 according to the first embodiment. The input/output controller 60 includes serial-to-parallel (SP) converters 100 and 111, and parallel-to-serial (PS) converters 101 and 110. The input/output controller 60 also includes input buffers 120 and 131, and output buffers 121 and 130. The SP converters 100 and 111 convert input serial data into parallel data. The PS converters 101 and 110 convert input parallel data into serial data. The SP converters 100 and 111 and PS converters 101 and 110 are coupled to the packet controller 30.

Eight-bit parallel data output from the packet controller 30 is input to the PS converter 110, or both the PS converters 101 and 110, and are converted into serial data. The converted data is output to a line 140 and a line 141 as electrical information via the output buffers 121 and 130, respectively. The PS converter 110 may include a general $8b/10b$ conversion process.

The lines 140 and 141 can be configured to carry a small-amplitude differential signal, respectively. With such a configuration, the line P140 (or P141) and the line N140 (or N141) are provided. When the potential on the line P140 (or P141) with respect to ground is higher than that on the line N140 (or N141) with respect to ground by a specific difference, it is defined that the line 140 (or 141) transmits a "1" signal. In contrast, a state where the potential on the line N140 (or N141) is higher than that on the line P140 (or P141) by a specific difference is defined as the line 140 (or 141) transmitting a "0" signal. These relations may be inverted. The lines 140 and 141 may not be necessarily configured for differential signals.

The differential signal on the lines 140 and 141 are converted into parallel data by SP converters 100 and 111 via the input buffers 120 and 131, respectively, and then output to the packet controller 30. In order for the memory card 1 to transmit and receive packets other than the data packet with the host device 2, the input buffers 120 and 131 and the output buffers 121 and 130 are controlled by the packet controller 30 so that the line 140 is used for communication from the host device 2 and the line 141 is used for the communication to the host device 2. Specifically, the serial data from the host device 2 may be input to the input buffer 120 on the line 140 and converted into parallel data by SP converter 100, and the converted data may be transmitted to the packet controller 30. In contrast, the parallel data from the packet controller 30 may be converted into serial data by PS converter 110, and the converted data may be transmitted on the line 141 via the buffer 130. Therefore, in this example, the packet controller 30 enables the input buffer 120 and the output buffer 130, and disables the output buffer 121 and the input buffer 131. In contrast, for data writing during transmission of the data packet, the input and output buffers are controlled by the packet controller 30 to allow the lines 140 and 141 to execute transmission to the memory controller 4 from the host device 2. Therefore, the packet controller 30 enables the input buffers 120 and buffer 131, and disables the output buffers 121 and 130. The buffer control as described so far realizes the half duplex mode.

(Operation)

Figure 6:
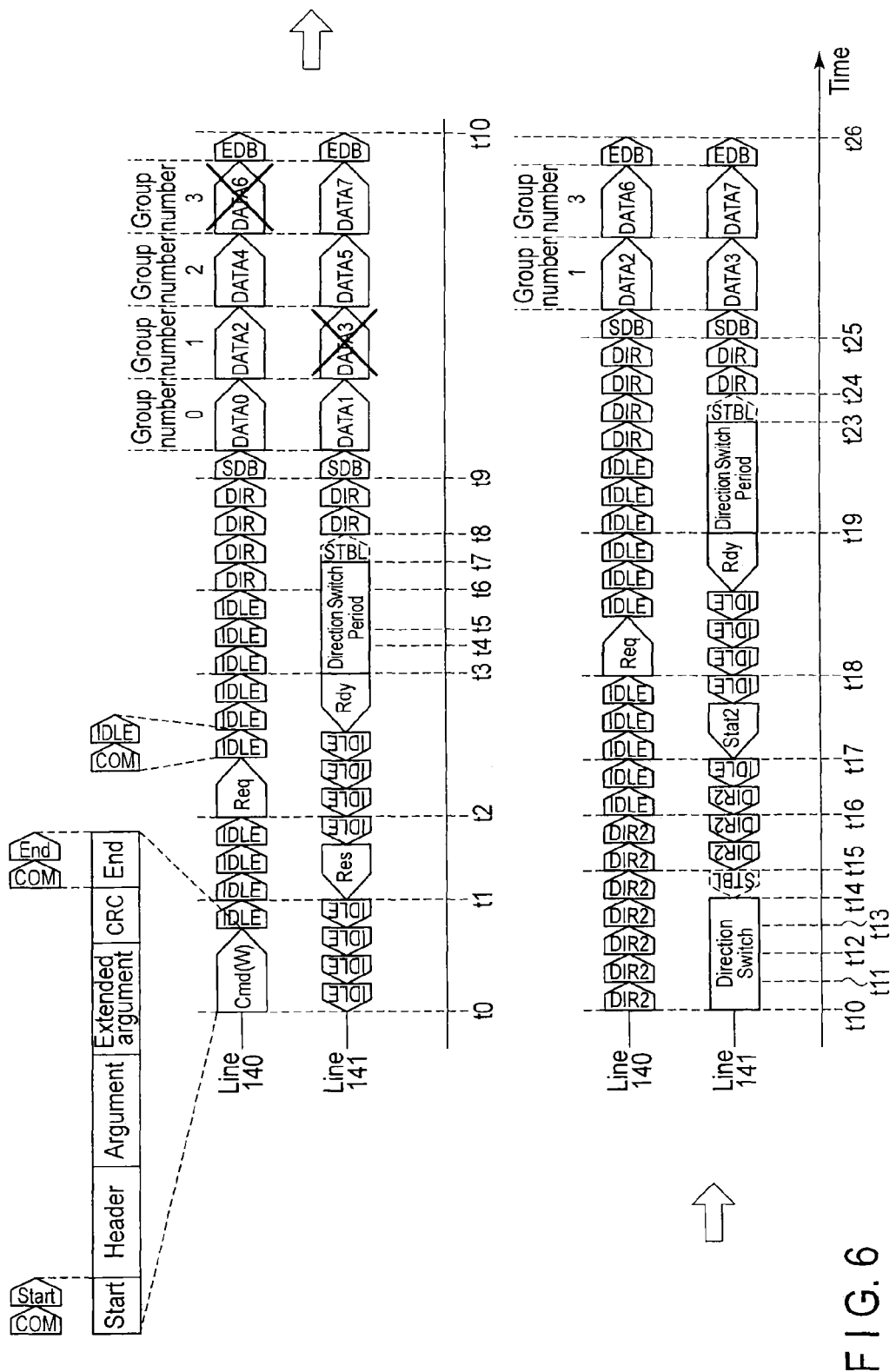
FIG. 6 illustrates a packet sequence during data writing to the memory card of the first embodiment in a half duplex mode.

An operation of the memory card of the first embodiment will now be described. FIG. 6 illustrates a packet sequence during data writing to the memory card of the first embodiment in the half duplex mode. An illustrated packet or symbol with the tip directed to the right indicates that it is directed to the memory card 1 from the host device 2. An illustrated packet or symbol with the tip directed to the left indicates that it is directed to the host device 2 from the memory card 1. The host device 2 and the memory card 1 transmit a necessary symbol in order to maintain a communicating state also while no packet is transmitted. As described above, the symbol is implemented by the message packet including information according to a role of the symbol.

At time t0, the host device 2 transmits a command packet (Cmd(w)) to the memory card 1 on the line 140. This command packet specifies the memory card 1 in its ID field and writing with its RW bit, and notifies data packet to be transmitted in the half duplex mode. Any packet including the command packet actually includes a start symbol (Start) and a symbol (End) before and after the configuration of FIG. 2, respectively. The start symbol indicates the head of a packet, and the symbol specifies the end of a packet. Furthermore, each symbol forms a pair with a command symbol (COM). The command symbol indicates a partition between symbols. For example, an idle symbol (IDLE) consists of a command symbol and an idle symbol. Any symbol including the command symbol is expressed as a unique bit string of a fixed length, which allows the receiver to specify the received symbol.

The host device 2 keeps transmitting idle symbols on the line 140 after the command packet. An idle symbol indicates an idle state where no packet is being transmitted. On the other hand, the memory card 1 keeps transmitting the idle symbols on the line 141. Hereinafter, it is assumed that the idle symbols are transmitted while no packet is being transmitted even without mentioning it.

At time t1, the memory card 1 transmits back a response packet (Res) to the host device 2, on the line 140. A response packet includes information indicating that the command specified in the command packet can be executed.

A period from time t2 to t3 is for determining whether data burst transmission is ready. At time t2, the host device 2 transmits the request packet (Req) on the line 140, and then the memory card 1 transmits back a ready packet (Rdy) on the line 141. A ready packet indicates the memory card 1 is ready.

From time t3 to t7, the memory card 1 and host device 2 reverse the direction of the communication on the line 141 to that to the memory card 1 from the host device 2. First, the packet controller 30 disables the output buffer 130 and input buffer 131 at time t4, and enables the input buffer 131 of the memory card 1 at time t5. At time t6, the host device 2 disables the input and output buffers in the host device 2 which are coupled to the line 141. At time t7, the host device 2 enables its output buffer coupled to the line 141, and sets the line 141 to a STBL state over a fixed period. During the STBL state, a STBL signal (STBL) is transmitted. The STBL signal is required, by some standard, to be transmitted after a buffer is turned on from off, and used to notify the receiver which received the signal of that the transmitter will start transmitting a symbol and a packet after the STBL signal by setting a transmitter buffer to an electrically fixed state. For example, the line N140 (or N141) is higher than the line P140 (or P141) by a specific magnitude or more during the STBL signal. The host device 2 also transmits a DIR symbol (DIR) from time t6 to t7 on the line 140.

At time t8, the host device 2 lifts the STBL state and transmits the DIR symbol on the line 141.

A period from time t9 to t10 is for data burst transmission, and is defined as a period between an SDB symbol (SDB) and an EDB symbol (EDB). An SDB symbol notifies the start of a burst data transmission period, and an EDB symbol notifies the end of a burst data transmission period. The host device 2 transmits the SDB symbol on the lines 140 and 141 at time t9. The symbol controller 40 of the memory controller 4 recognizes the start of the burst data transmission period through detection of the SDB symbol. In response to detection of the start symbol after the SDB symbol, the symbol controller 40 instructs the packet controller 30 to receive a packet hereinafter.

The host device 2 then transmits a data packet. How many data packets are transmitted in one data burst transmission period is determined in advance by a negotiation before the operation of FIG. 6. FIG. 6 illustrates an example transmission of four unit-data items. The four-unit data items are assigned group numbers 0 to 3, respectively. Therefore, the bitmap field Bitmap [3:0] in the data packets is used. One the other hand, the bitmap field Bitmap [15:4] is reserved in the ongoing context, and may include "0" bits.

The host device 2 transmits the first unit data assigned group number 0 as the data 0 and data 1 packets in parallel on lines 140 and 141 in accordance with the above principle, respectively. When the CRC checks for the data 0 and data 1 packets are successful, the packet controller 30 alternately writes one byte of the payload section of the data 0 packet, and one byte of the payload section of the data 1 packet in the buffer 20. The packet controller 30 determines that the reception for group number 0 was successful based on the success of the CRC check. The response bit generator 51 stores a bit which indicates whether successful reception or not for each group number. For group number 0, "1" bit, which indicates successful reception, is set.

The host device 2 then transmits the second unit data assigned group number 1 as the data 2 and data 3 packets on lines 140 and 141 in accordance with the above principle, respectively. Between the data 0 and data 2 packets and between the data 1 and data 3 packets, no symbol or a symbol such as the idle symbol or idle symbols may be transmitted. The same holds true for subsequent successive data packets.

Assume, as an example, that the packet controller 30 successfully received the data 2 packet, but unsuccessfully received the data 3 packet. Failure to receive a data packet may be based on failure of the CRC check and/or failure of detection of the start symbol or the end symbol. The packet controller 30 determines that reception for group number 1 was unsuccessful based on the failure of reception of the data 3 packet. A case for all the data packets received successfully will be described in a second embodiment.

Similarly, the third unit data assigned group number 2 is transmitted as the data 4 and data 5 packets, and the fourth unit data assigned group number 3 is transmitted as the data 6 and data 7 packets. Assume, as an example, that the data 4, data 5, and data 7 packets were received successfully, and the data 6 packet received unsuccessfully. On the basis of such an example, it is determined that group numbers 0 and 2 were successfully received, and group numbers 1 and 3 was unsuccessfully received. This results in a bit string generated by the response bit generator 51 being "1010".

The host device 2 transmits the EDB symbol on the lines 140 and 141 after it transmits all the data packets in one burst transmission period. The memory card 1 recognizes the end of the burst data transmission period by detection of the EDB symbol.

The memory card 1 and host device 2 then control the input and output buffers coupled to the line 141 to prepare for a response by the memory card 1 during a period from time t10 and t14. Specifically, the memory card 1 and host device 2 reverse the direction of communication on the line 141 to that to the host device 2 from the memory card 1. First, the host device 2 transmits a DIR2 symbol (DIR2) from the output buffer in the host device 2 which is coupled to the line 140 at time t10. A DIR2 symbols has a unique bit pattern different from that of other symbols. This allows the symbol controller 40 to distinguish the DIR2 symbol from the DIR symbol. One of functions of the DIR2 symbol is to indicate the direction of the line on which it is transmitted as the DIR symbol. A further function of the DIR2 symbol is to indicate how a response should be made when all the data packets were successfully received. The details thereof will be described in the second embodiment.

In response to detection of DIR2 symbol, the symbol controller 40 instructs the packet controller 30 to generate the status 2 packet. The bit string to indicate successful reception for each group number currently stored in the response bit generator 51, which is "1010" in the ongoing context, is set in the Bitmap [3:0] field of the status 2 packet by the packet controller 30. The packet controller 30 also sets a bit which indicates that the data packet reception was erroneous in its argument section.

At time t11, the host device 2 disables the input and output buffers in the host device 2 which are coupled to the line 141. At time t12, the host device 2 enables the input buffer in the host device 2 which is coupled to the line 141. At time t13, the packet controller 30 disables the output buffer 130 and input buffer 131. The host device 2 keeps transmitting the DIR2 symbols on the line 140 from time t11 to t13. The length from time t10 to t13 is a fixed one negotiated in advance of the operation of FIG. 6 between the host device 2 and memory card 1.

At time t14, the memory card 1 sets the line 141 to the STBL state over the fixed period. This corresponds to transmission of the STBL signal on the line 141. At time t15, the memory card 1 lifts the STBL state and transmits the DIR2 symbols on the line 141. In response to detection of reception of the DIR2 symbol from the memory card 1 at time t16, the host device 2 transmits the idle symbol on the line 140.

At time t17, the packet controller 30 transmits the generated status 2 packet on the line 141. This status 2 packet includes a bit which indicates existence of an error and the bit string which indicates success or failure of the reception for each group number as described above. Upon reception of such status 2 packet, the packet controller (not shown) in the memory controller of the host device 2 recognizes the status 2 packet and that it includes an error bit. Furthermore, the packet controller recognizes that retransmission for group numbers 1 and 3 is required based on the bitmap field information. From time t18 to t25, the same operations as those from time t2 to t9 respectively are executed as preparation for retransmission of the data packets.

At time t25, the host device 2 retransmits the data for the group number specified by the status 2 command after it transmits the SDB symbol. Specifically, the host device 2 transmits the data 2 and data 3 packets for group number 1 on the lines 140 and 141, respectively. It then transmits the data 6 and data 7 packets for group number 3 on the lines 140 and 141, respectively. The subsequent EDB symbol transmission concludes the data transmission. The data stored in the buffer 20 is then written in the memory 3.

The given example relates to an example which assigns the one same group number to two data packets. However, the number of data packets assigned the same group number is not limited to two, and it may be four, for example. On the basis of such an example, group number 0 is assigned to the data 0 to data 3 packets, and group number 1 is assigned to the data 4 to data 7 packets. When at least one of the data 0 to data 3 packets was unsuccessfully received also in this example, the memory card 1 may set "0" at the bit in the bitmap field in the status 2 packet corresponding to group number 0 and transmits it to the host device 2, for example. The host device 2 then retransmits the data 0 to data 3 packets to the memory card 1.

The given example also relates to an example which includes the bitmap information in the status 2 packet. Alternatively, the group number including an error may be directly specified in the status 2 packet. With the FIG. 6 example where an error is included in group numbers 1 and 3, information of the numbers 1 and 3 is included in the status 2 packet as shown in FIG. 7. The size of the sequential number field (SeqNum1, 2) is set to a predetermined length such as eight bits.

The description has been made to the data writing to the memory card 1 so far. An operation of data reading is the same as that of the data writing. Specifically, during data reading, the host device 2 transmits a command packet, the memory card 1 transmits a data packet, and the host device 2 responds to it. The roles assumed by the memory card 1 and host device 2 during the data writing are only switched, and the commands and symbols transmitted and received are the same as those during the data writing with their directions reversed. With the reverse of the communication direction, enabling and disabling the input and output buffers in the memory card 1 and host device 2 are also reversed.

In the description so far, the DIR2 packets are transmitted on the line 140 from time t10 to time t16. One of objectives of the DIR2 packet is to request a response according to a second embodiment as will be described in the second embodiment. When the response according to the second embodiment is not required, the DIR packet may be transmitted instead of the DIR2 packet from time t10 to t16.

As described above, according to the memory card 1 according to the first embodiment, the status 2 packet is defined to allow for transmission, reception and recognition of the status 2 packet and corresponding operations. Specifically, the packet controller 30 generates and recognizes the status 2 packet. The status 2 packet includes information for specifying a unit data item transmitted during one burst transmission period. The host device 2 also recognizes the status 2 symbol, recognizes the specified unit data item from its group number, and retransmits only the specified unit data item. This can reduce the time taken to retransmit unsuccessfully received packet from a case of retransmission of all unit data items.

Second Embodiment

The second embodiment relates to a response when all the data packets were successfully received during a burst data transmission period.

A memory card 1 according to the second embodiment has a same configuration as that of the first embodiment (FIG. 4); however, operations of the packet controller 30, symbol controller 40 and response controller 50, and control by the CPU 70 differ from those of the first embodiment. Correspondingly, the packet controller 30, symbol controller 40 and response controller 50, and the CPU 70 based on a program are configured to execute operations described in the following. All description of the first embodiment applies to all features not mentioned in the following description including configurations and following operations. Prior to description of the operation according to the present embodiment, a conventional operation will be briefly described.

(Reception of Data Packet in Half Duplex Mode by Conventional Memory Card)

Figure 8:
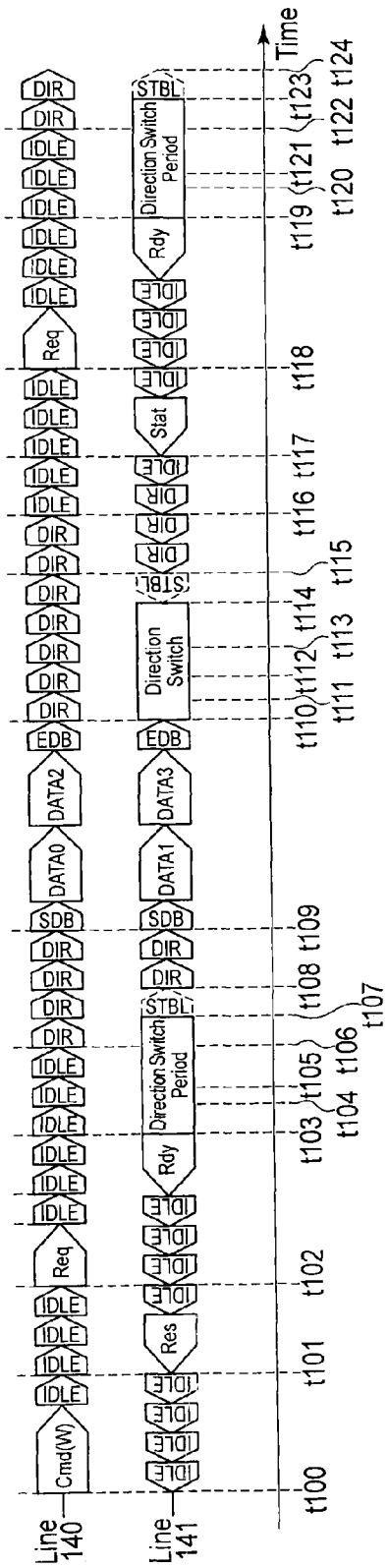
FIG. 8 illustrates a packet sequence during data writing to a conventional memory card in the half duplex mode.

FIG. 8 illustrates a packet sequence to a conventional memory card during data writing in the half duplex mode. Operations from time t100 to t109 are the same as those from time t0 to t9 of the first embodiment (FIG. 6). The host device transmits the data 0 and data 1 packets on lines 140 and 141, respectively, and then transmits the data 2 and data 3 packets, respectively, in the data burst transmission period from time t109 to t110. The data 0 and data 1 packets are generated from one unit data, and the data 2 and data 3 packets are generated from other unit data. Assume that all these data packets were successfully received. The host device then transmits the EDB symbol.

Operations from time t110 to t117 are the same as those from time t10 to t17 of the first embodiment (FIG. 6) except for the DIR symbol transmitted instead of the DIR2 symbol. At time t117, the memory card reports that all the data packets were received through transmitting a status packet on the line 141. When at least one data packet was unsuccessfully received, the memory card transmits the status packet including a report bit which indicates erroneous reception in order to request retransmission of all the data packets. Operations after time t118 are performed when there is further data burst transmission or retransmission, and they are the same as those from time t102 to t117.

(Reception of Data Packet in Half Duplex Mode by Memory Card of First Embodiment)

Figure 9:
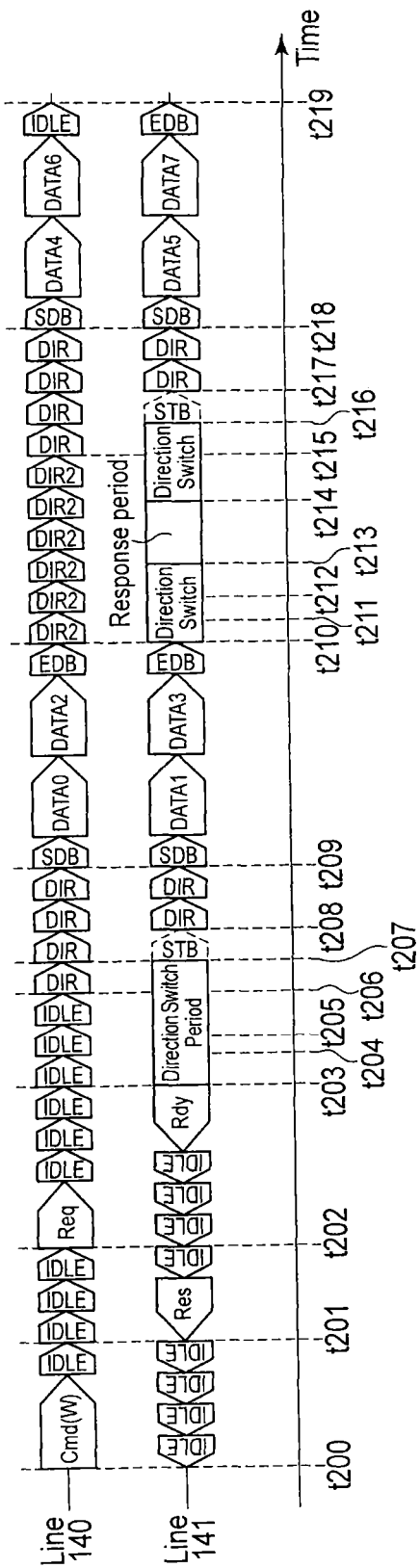
FIG. 9 illustrates a packet sequence during data writing to the memory card according to a second embodiment in the half duplex mode.

A memory card operation of the second embodiment will now be described. FIG. 9 illustrates a packet sequence during data writing to the memory card of the second embodiment in the half duplex mode. Operations from time t200 to t209 are the same as those of the first embodiment (FIG. 6).

A period from time t209 to t210 is a data burst transmission period. The host device 2 first transmits a first unit data as the data 0 and data 1 packets on the lines 140 and 141 in parallel in this data burst transmission period. The host device 2 then transmits a second unit data as the data 2 and data 3 packets on the line 140 and 141 in parallel. Assume that all these data packets were successfully received. In other words, assume that no error was detected as a result of the CRC check to the data packets. The subsequent operations from time t210 to t212 are the same as those from time t10 to t12 of the first embodiment (FIG. 6).

In accordance with the memory card 1 receiving the DIR2 symbols on the line 140, the packet controller 30 disables the output buffer 130 and the input buffer 131 at time t213. The memory card 1 also makes a response for the successful reception of the data packets without transmitting a status packet during a period from time t213. Specifically, the memory card 1 recognizes the DIR2 symbol, and learns that the host device 2 which transmits the DIR2 symbol requests a response according to the present embodiment. More specifically, when the memory card 1 successfully received all the transmitted data packets such as the data 0 to data 3 packets in the FIG. 9 example, it controls the packet controller 30 to make a response according to the present embodiment. The response is to maintain both the lines N141 and P141 in a specific state for a fixed period, i.e., from time t213 to t214. For example, the memory card 1 maintains both the lines N141 and P141 at the high-level state. Alternatively, the memory card 1 fixes both the lines N141 and P141 to a state lower than a fixed potential, or specifically it may pull them down to ground via a resistor. Alternatively, the memory card 1 fixes both the lines N141 and P141 to a state higher than a fixed potential, or specifically it may pull them up to the power supply potential via a resistor. Upon reception of such a response, the host device 2 learns that all the transmitted data packets were successfully received by the memory card 1. The DIR2 symbols keeps flowing on the line 140 from time t213 to t214.

From time t214 to t216, the memory card 1 and host device 2 reverse the direction of the communication on the line 141 to that to the host device 2 from memory card 1. First, at time t214, the packet controller 30 enables the input buffer 130 of the memory card 1. At time t215, the host device 2 disables the input and output buffers in the host device 2 which are coupled to the line 141, and transmits the DIR2 symbol on the line 140. At time t216, the host device 2 enables the output buffer in the host device 2 which is coupled to the line 141, and sets the line 141 to the STBL state.

Operations from time t217 to t219 are the same as those from the t208 to t210. They are only different in their contents of the data packets.

Note that the transmission of the DIR2 symbol just after the EDB symbol by the host device 2 may be limited to a case with a further data packet to be transmitted. Specifically, when there is no data packet to be transmitted continuously, the host device 2 transmits the DIR symbol immediately after the EDB symbol transmission, and urges the memory card 1 to transmit the status packet. Moreover, the memory card 1 may transmit the status packet when the memory card 1 has recognized that there is no further data packet to be received from the value in the transmission length field in the command packet even when the memory card 1 receives the DIR2 symbol immediately after EDB symbol transmission.

Description has been given of an example of the data writing to the memory card 2 also in the second embodiment; however, an operation of data reading is the same as that of data writing. Specifically, the roles assumed by the memory card 1 and host device 2 during the data writing are only switched, and the commands and symbols transmitted and received are the same as those during the data writing with their directions reversed. The other description for the data reading in the first embodiment also applies to the second embodiment.

As described above, according to the memory card 1 according to the second embodiment, the status 2 symbol is defined as in the first embodiment. For this reason, the same advantages as those of the first embodiment can be obtained. Moreover, according to the memory card 1 according to the second embodiment, the DIR2 symbol is defined, and transmission, reception and recognition of the DIR2 symbol and corresponding operations are possible. Specifically, the symbol controller 40 generates and recognizes the DIR2 symbol, and components in the memory controller 4 operate in accordance with the DIR2 symbol. The memory card 1 which received the DIR2 symbol reports that it successfully received all the data packets transmitted during the corresponding burst data transmission period through fixing of the line to a specific potential without transmitting a packet. This can reduce time taken to report the successful reception. Specifically, although the response period from time t213 to t214 itself is still necessary, the period for transmitting the DIR symbol required after the reverse of the communication direction of the line 141 such as that between time t114 and t117 of FIG. 8 is unnecessary. Moreover, since transmission of the status packet is unnecessary, a power required for the transmission is not consumed.

Third Embodiment

In the second embodiment, the information which specifies the group number is included in the data packet. In contrast, the third embodiment relates to specifying the group number to be retransmitted without specifying the group number in the data packet.

A memory card 1 according to the third embodiment has the same configuration as that of the first embodiment (FIG. 4); however, operations of the packet controller 30, symbol controller 40, and response controller 50, and control by the CPU 70 differ from those of the first embodiment. Correspondingly, the packet controller 30, symbol controller 40 and response controller 50, and the CPU 70 based on a program are configured to executed operations described in the following. All description of the first embodiment applies to all features not mentioned in the following description including configurations and following operations.

Figure 10:
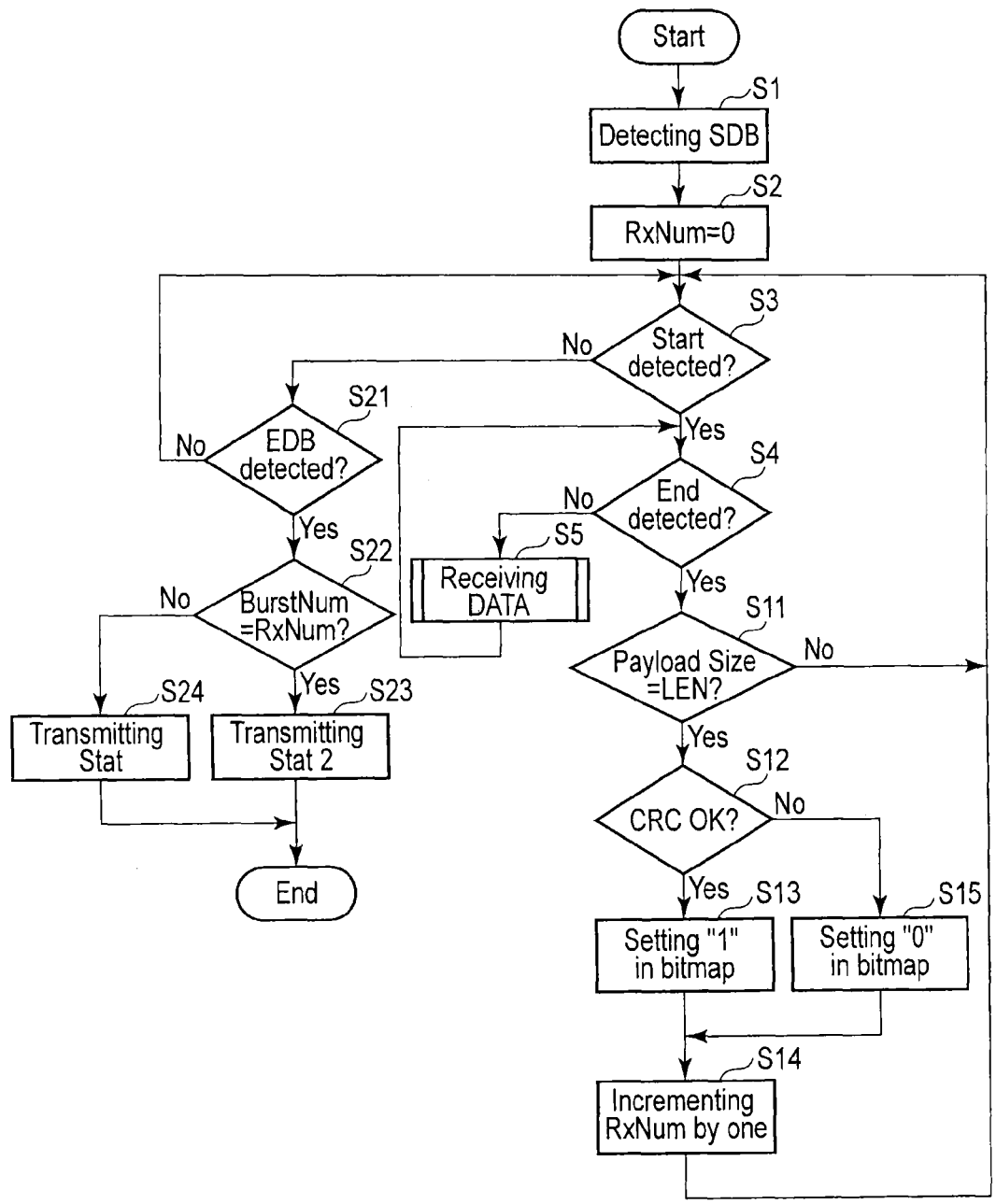
FIG. 10 illustrates a data reception flow by a memory card according to a third embodiment.

FIG. 10 illustrates a data reception flow by the memory card according to the third embodiment. FIG. 10 illustrates operations from burst data transmission to retransmission request. Therefore, prior to the flow of FIG. 10, the operations from time t0 to t9 in FIG. 6, for example, are completed. As shown in FIG. 10, the symbol controller 40 detects the SDB symbol in step S1. The packet controller 30 then resets a parameter RxNum to 0 (step S2). The parameter RxNum is an internal parameter used by the packet controller 30, and for calculating the number of the received group.

The symbol controller 40 checks whether it detected the start symbol (step S3). When the determination in step S3 is YES, the symbol controller 40 determines whether it detected the end symbol in step S4. When the determination in step S4 is NO, the packet controller 30 receives data items in units of one byte, or two (step S5). This is repeated until the end symbol is detected. In other words, the process returns to step S4 after step S5.

When the determination in step S4 is YES, the packet controller 30 determines whether the size of the payload of the received packet matches a predetermined value (step S11). In other words, it is determined whether the whole data which should be included in the payload was received. For example, assume that the size of the payload included in one data packet was determined to be 256 bytes by the negotiation between the host device 2 and memory card 1. Furthermore, assume that the header and CRC sections are two-bytes in length, respectively. With such a context, the total size of the data received prior to step S11 must be 260 bytes. Then, it can be determined that the whole payload section was received.

When the determination in step S11 is YES, the CRC processor 31 executes error detection to the received data packet using its CRC (step S12). When the determination in step S12 is YES, this means one data packet, i.e., the data for one group number on line 140 or 141 was successfully received. Then, the response bit generator 51 sets "1" to a bit corresponding to the corresponding group number (or the group number under process) in the bitmap information (step S13). Moreover, the packet controller 30 increments the parameter RxNum by one in order to increase a record of the number of the received group (step S14). In contrast, when the determination in step S12 is NO, this means one data packet, i.e., the data for one group number on line 140 or 141 was unsuccessfully received. Then, the response bit generator 51 sets "0" to a bit corresponding to the corresponding group number in the bitmap information (step S15). The process then proceeds to step S14. After step S14 or when the determination in step S11 is NO, the process returns to step S3. Generation of the bitmap information will be described in full detail below.

When the determination in step S3 is NO, the symbol controller 40 determines whether the EDB symbol was detected (step S21). When the determination in step S21 is NO, the process returns to step S3. When the determination in step S21 is YES, it is determined whether the parameter RxNum in the packet controller 30 matches a predetermined parameter BurstNum (step S22). The parameter BurstNum is the number of bursts (i.e., the number of unit data items) which is determined by the memory card 1 and host device 2 by the negotiation prior to the data transmission and which should be transmitted during one burst transmission period.

When the determination in step S22 is YES, this means that all the data bursts transmitted during the data burst transmission period was received by the memory card 1. Then, the packet controller 30 transmits the status 2 packet in order to report whether each data packet was successfully received (step S23). This status 2 packet includes the bitmap information which indicates successful reception for each group and which was generated by the response bit generator 51 in steps S13 and S15. The details of transmission of the status 2 packet after the EDB symbol transmission are the same as those in the first embodiment. The host device 2 receives this status 2 packet and retransmits a specific data packet to the memory card 1 based on the contents thereof.

In contrast, when the determination in step S22 is NO, this means that all the data packets transmitted during the data burst transmission period were unsuccessfully received by the memory card 1. Then, the packet controller 30 transmits the status packet including a report bit which indicates that a reception error occurred in order to request retransmission of all the data packets (step S24). The details of the transmission of the status 2 packet after the EDB symbol transmission are the same as those of the first embodiment. When the host device 2 receives this status packet, it retransmits all the data packets to the memory card 1.

A description will now be given of an example of the bitmap generated by the response bit generator 51 and a flow. The following description assumes an example where four burst data items (or four unit-data items) are transmitted during one burst data transmission period.

Figure 11:
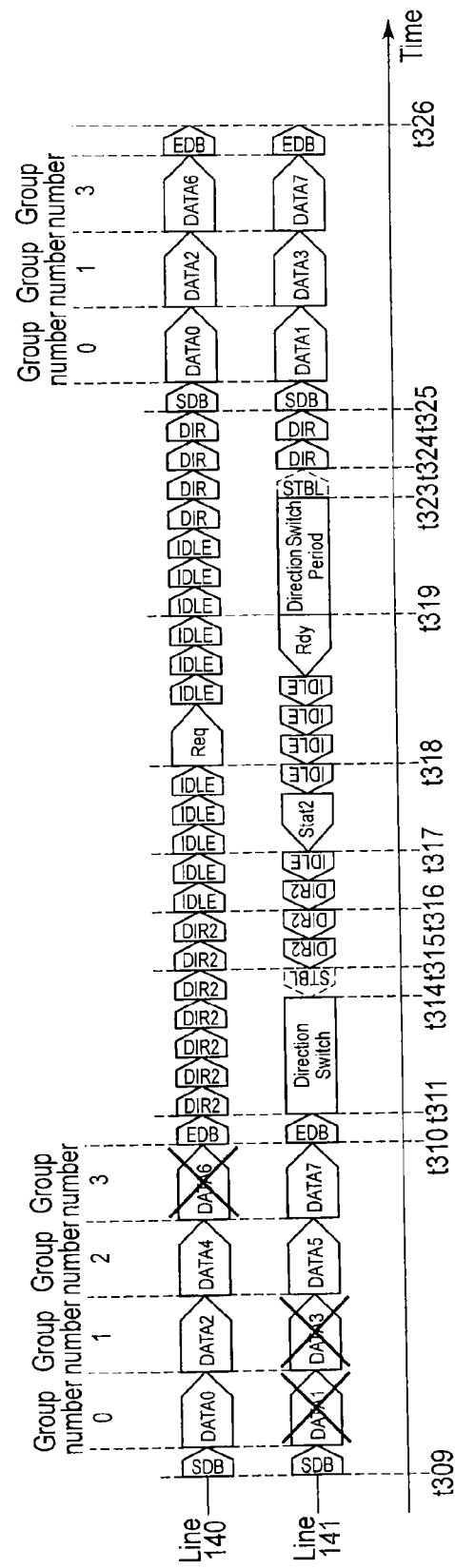
FIG. 11 illustrates a packet sequence during data writing to the memory card of the third embodiment in the half duplex mode.

FIG. 11 illustrates an example packet sequence in during data writing to the memory card according to the third embodiment in the half duplex mode. FIG. 11 illustrates operations from burst data transmission to a retransmission request. The operations before time t309 are the same as those from time t0 to t9 of the first embodiment (FIG. 6).

During the burst data transmission period from t309 to t310, the host device 2 transmits the data 0 and data 1 packets of group number 0, and then the data 2 and data 3 packets of group number 1. The host device 2 then transmits the data 4 and data 5 packets of group number 2, and then the data 6 and data 7 packets of group number 3.

Assume an example where the data 0, data 2, and data 4 packets were successfully received on the line 140, and the result of the CRC check of the data 6 packet failed. With such a context, the bitmap 140 for the line 140 [3:0] will be "0111" because the bits [0] to [3] correspond to group numbers 0 to 3, respectively, as an example.

Further assume an example where only the data 5 packet was successfully received on the line 141 and the data 1, data 3, and data 7 packets were unsuccessfully received. With such context, the bitmap 141 for the line 141 [3:0] will be "0100", for example.

The response bit generator 51 calculate AND of the bitmap 140 and bitmap 141. The resulting bitmap [3:0] is "0100." The response bit generator 51 includes this result in the status 2 packet, which is then transmitted by the packet controller 30 at time t317. Operations from time t310 to t317 are the same as those from time t10 to t17 of the first embodiment.

After execution of the same operations from time t318 to t325 as those from t18 to t25 of the first embodiment, the specified packets are retransmitted by the host device 2 from time t325 to t326. Based on the bitmap "0100" in the status 2 packet specifying retransmission of the data packets of group numbers 0, 1, and 3, the retransmitted packets are the data 0, data 1, data 2, data 3, data 6, and data 7 packets.

Also in the third embodiment, when all the data packets transmitted during one data burst transmission period were successfully received, a response is made by setting the lines N141 and P141 to a specific potential as between time t213 to t214 of the second embodiment. Alternatively, the status packet may be transmitted as illustrated in and described with reference to FIG. 8.

Description has been given of an example of the data writing to the memory card 2 also in the third embodiment; however, an operation of data reading is the same as that of data writing. Specifically, The roles assumed by the memory card 1 and host device 2 during the data writing are only switched, and the commands and symbols transmitted and received are the same as those during the data writing with their directions reversed. The other description for the data reading in the first embodiment also applies to the third embodiment.

As described above, according to the memory card 1 according to the third embodiment, the status 2 symbol and DIR2 symbol are defined as in the first and second embodiments. For this reason, according to the third embodiment, the same advantages as those of the first and second embodiments can be obtained. Moreover, by the comparison between the number of data packets (or the number of bursts) received by the packet controller 30 and the number which should be received, and by using the logical operation of bits based on success of reception of the data packets transmitted on the two lines, a data packet to be retransmitted cane be specified, and the result is indicated in the status 2 symbol. For this reason, the group number is not specified in the data packet. Therefore, it is unnecessary to change the definition of the data packet, and there is also no possibility that the maximum group numbers would be restricted by the size of the header of the data packet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory device comprising:
a memory; and
a controller which
controls the memory,
communicates with a host device via a first signal line and a second signal line,
receives data items to be written in the memory from the host device on the first and second signal lines in a first period, where the same group number is assigned to two data items which flow in parallel on the first and second signal lines and each of the data items are received between a first symbol and a second symbol,
performs a cyclic redundancy code (CRC) check to determine that a data item was correctly received when the CRC check passes and unsuccessfully received when the CRC check fails, counts a number of pairs of a first symbol and a second symbol received after reception of a corresponding first symbol in the first period, detects an end of the first period by reception of a third symbol; and after the end of the first period, transmits to the host device a response packet including an indication of a group number assigned to an unsuccessfully received one of the data items when the number of pairs of a first symbol and a second symbol received after reception of the corresponding first symbol matches a first value, determines, when at least one of two data items assigned the same group number was unsuccessfully received, that reception for the group number failed; and fixes the second signal line to a specific potential over a second period without transmitting a packet for a response for the first period when all the data items were successfully received.

2. The device of claim 1, wherein
when the controller successfully receives all the data items and a fourth symbol, the controller executes the fixation of the second signal line.

3. The device of claim 1, wherein
the second signal line includes a first sub-line and a second sub-line, and
the fixation of the second signal line includes fixing both the first and second sub-lines to a high level, a low level, a potential lower than a potential, or a potential higher than a potential.

4. The device of claim 1, wherein the controller
counts a count that a data size between a first symbol and a second symbol after reception of the corresponding first symbol matches a first length,
specifies the group number assigned to one data item which was unsuccessfully received based on the count, and
transmits the response packet including the indication of the specified group number to the host device.

5. The device of claim 1, wherein
the controller usually uses the first and second signal lines to transmit signals flowing in opposite directions, and
the two data items assigned the same group number comprise segments of data exclusive to each other.

6. The device of claim 5, wherein
the response packet requests retransmission of two data items assigned a group number specified by the indication.

7. The device of claim 1, wherein
the controller transmits the response packet to the host device in response to reception of a fourth symbol.

8. A semiconductor memory device comprising:
a memory; and
a controller which
controls the memory,
communicates with a host device via a first signal line and a second signal line,
detects a start of a first period by reception of a first symbol,
receives data items to be written in the memory from the host device on the first and second signal lines in the first period, where the same group number is assigned to two data items which flow in parallel on the first and second signal lines and each of the data items are received between a start symbol and an end symbol,
counts a number of pairs of a start symbol and an end symbol in the first period,
detects an end of the first period by reception of a second symbol; and
after the end of the first period, transmits to the host device a response packet including an indication of a group number assigned to an unsuccessfully received one of the data items when the number of pairs of a start symbol and an end symbol matches a first value.

9. The device of claim 8, wherein
the controller fixes the second signal line to a specific potential over a second period without transmitting a packet for a response for the first period when all the data items were successfully received.

10. The device of claim 8, wherein
when the controller successfully receives all the data items and a third symbol, the controller executes the fixation of the second signal line.

11. The device of claim 8, wherein
the second signal line includes a first sub-line and a second sub-line, and
the fixation of the second signal line includes fixing both the first and second sub-lines to a high level, a low level, a potential lower than a potential, or a potential higher than a potential.

12. The device of claim 8, wherein
the controller
counts a count that a data size between a start symbol and an end symbol after reception of the corresponding start symbol matches a first length,
specifies the group number assigned to one data item which was unsuccessfully received based on the count, and
transmits the response packet including the indication of the specified group number to the host device.

13. The device of claim 8, wherein
the controller usually uses the first and second signal lines to transmit signals flowing in opposite directions, and
the two data items assigned the same group number comprise different segments of data.

14. The device of claim 13, wherein
the response packet requests retransmission of two data items assigned a group number specified by the indication.

15. The device of claim 8, wherein
when at least one of two data items assigned the same group number was unsuccessfully received, the controller determines that reception for the group number failed.

16. The device of claim 8, wherein
the controller transmits the response packet to the host device in response to reception of a third symbol.

* * * * *